United States Patent [19]
Teskin

[11] Patent Number: 4,704,421
[45] Date of Patent: Nov. 3, 1987

[54] NUCLEATION OF PROPYLENE POLYMERS

[75] Inventor: Frederick M. Teskin, Herndon, Va.

[73] Assignee: El Paso Products Company, Odessa, Tex.

[21] Appl. No.: 762,903

[22] Filed: Aug. 6, 1985

[51] Int. Cl.$^4$ .............................................. C08K 5/09
[52] U.S. Cl. ................................... 524/287; 524/284; 524/300; 524/570; 524/583; 524/584; 528/485; 528/486; 528/488
[58] Field of Search ...................... 528/485, 486, 488; 524/287, 300, 583, 584

[56] References Cited

U.S. PATENT DOCUMENTS 3,299,029  1/1967  Binsbergen et al. ............ 528/486 X
4,284,762  8/1981  Miyata et al. ...................... 528/485
4,476,297  10/1984  Kablitz et al. ...................... 528/486

FOREIGN PATENT DOCUMENTS 1001709  8/1965  United Kingdom .

Primary Examiner—Theodore E. Pertilla
Attorney, Agent, or Firm—Fred S. Valles; Margareta LeMaire

[57] ABSTRACT

Propylene polymers produced by high-activity support based coordination catalysts are effectively nucleated with benzoic acid and adipic acid, yielding molding resins of high clarity.

3 Claims, No Drawings

NUCLEATION OF PROPYLENE POLYMERS

BACKGROUND OF THE INVENTION

Polypropylene homo- and random copolymers are inherently translucent due to the nature of the polymer morphology. Clarity improvement can be realized by controlling the rate of crystal growth as the molten polymer solidifies upon cooling in the final molding step. This requires the use of so-called "nucleating agents" which act to reduce spherulite size by shifting the nucleus formation curve closer toward the polymer melting point, thereby making nucleation rather than spherulite growth the dominant solidification process. This mechanism results in enhanced clarity in molded articles of propylene homo- and random copolymer. In general, the nucleating agents used are salts of aromatic or alicyclic carboxylic acids (e.g. sodium benzoate), which are very effective in propylene polymers produced in the presence of non-supported conventional catalysts of the type $n.TiCl_3.AlCl$ promoted with organoaluminum catalysts.

U.S. Pat. No. 3,299,029 discloses a method of nucleating propylene polymers using as the nucleating agent an aluminum salt of a carboxylic acid such as benzoic acid, adipic acid, etc., which salt has been formed by reacting the carboxylic acid and a basic aluminum compound such as aluminum hydroxide or aluminum alkoxide in the presence of the polymer. The carboxylic acid and the aluminum compound are mixed in the form of separate suspensions with a suspension of the polymer and the resultant mixture is then freed from liquid prior to the final crystallization step. An obvious disadvantage of such a process is the cost associated with the liquid removal step.

Recently new catalysts have been developed which are far more active than the aforementioned conventional catalysts in the polymerization of 1-olefins. Briefly described, these catalysts are comprised of a titanium halide catalyst component supported on magnesium dihalide and an alkylaluminum compound, which can be present as a complex with an electron donor compound. These catalyst compounds have been described in the patent literature, e.g. in U.S. Pat. Nos. 3,830,878, 3,953,414, 4,051,313, 4,115,319 and many others.

The productivities obtained with these new catalysts are extremely high, resulting in polymers containing such small quantities of acidic residual catalyst that the conventional deashing step can be dispensed with. Using conventional nucleating agents such as sodium benzoate in propylene polymers produced with the newer, high-activity support-based coordination catalysts have failed to result in acceptable improvement in clarity, because of the presence of the aforementioned catalytic residues and neutralizing agents in the polymer.

It is, therefore, an object of the present invention to provide a novel process for the production of propylene polymer composition of improved clarity, which polymer has been prepared in the presence of support-based high-activity coordination catalyst.

THE INVENTION

In accordance with the present invention, there is provided a process for the production of propylene polymers of improved clarity which comprises mixing an undeashed propylene polymer prepared by polymerization in the presence of a high-activity catalyst composition containing a magnesium halide-supported titanium-halide catalyst component with from about 0.1 to about 0.3 wt% of benzoic acid or adipic acid based on the weight of the polymer, in the absence of added free aluminum hydroxide or aluminum alkoxide, melting the mixture and solidifying the melted mixture.

It was unexpectedly found that the use of benzoic and adipic acids as nucleating agents in propylene polymer resins obtained by polymerization in the presence of a high-activity support-based catalyst, resulted in improved clarity above that achieved in the absence of a nucleating agent, provided that the acid concentration was at least 0.1%. In fact, at lower concentrations, e.g. at 0.025%, there occured a decrease in visual clarity as compared to that obtained without the use of acid.

Surprisingly, incorporation of benzoic and adipic acid in standard deashed propylene polymer resins produced via conventional unsupported catalysts, did not provide these pronounced clarity improvements. Additions of a magnesium-aluminum hydroxycarbonate neutralizer in combination with the acid nucleating agent in a standard, deashed propylene polymer resin did not improve clarity as might have been expected since the neutralizer is a complex basic compound containing both aluminum and hydroxyl groups.

The polymers which are useful in this invention are derived predominantly from propylene (i.e. at least 75% by weight) and are produced by well-known processes involving the use of any of the recently developed supported, highly active and stereospecific catalysts. Generally, these new catalysts are comprised of an aluminum alkyl component and a titanium compound supported on magnesium dihalide as a second component. Homopolymers, copolymers of propylene with other simple 1-olefins, such as ethylene and butene-1, and blends thereof can be used. Also, other 1-olefin resins can be blended with any of the aforementioned propylene resins, e.g. linear low density polyethylene (LLDPE) which is an interpolymer of ethylene and at least on $C_4$-$C_{18}$ 1-olefin as comonomer, preferably a $C_4$-$C_{18}$ 1-olefin. The LLDPE resins are mainly categorized according to density rather than chemical composition and should have a density in the range between about 0.915 and about 0.940. The polymerized propylene content of the total polymer, whether it be composed of one or more components should preferably be at least 80% by weight. Random copolymers of propylene and ethylene containing between about 1 and about 10 wt% ethylene, and mixtures of such random copolymers with a LLDPE resin are especially suitable.

A neutralizing agent should be added to the polymer in quantities effective to reduce the corrosive effect of the support-based catalyst residues present in the polymer and to increase the thermal stability of the polymer. Particularly useful in this invention, are the hydrotalcite neutralizers which are magnesium-aluminum hydroxycarbonates. Generally, the concentration of neutralizer should range between about 0.01 to about 3% by weight based on the polymer weight.

To increase the thermal and oxidative stability of the polymer, any of the well-known commercially available antioxidants such as hindered phenols, phenolic phosphites, secondary arylamines and the like should be incorporated into the polymer resin usually in quantities between about 0.01 to about 1%, preferably between about 0.05 to about 0.5% by weight based on the polymer weight. Examples of such antioxidants include butylated hydroxy toluene, tetrakis methylene-(3,5-di-t-butyl-4-hydroxyhydrocinnamate)methane, (1,3,5-trimethyl-2,4,6-tris(3,5-t-butyl-4-hydroxybenzyl)benzene, bis(2,4-di-t-butylphenyl)pentaerythritol diphosphite, phenylenediamines, 3,5-di-tert-butyl-4-hydroxyhydrocinnamic acid triester with 1,3,5-tris(2-hydroxyethyl)-s-triazine-2,4,6(1H,3H,5H)-trione and many others.

Other special function additives can also be incorporated into the polymer such as colorants, antiblocking agents, antistatic agents, lubricants, etc.

Any conventional nucleation methods can be used for uniformly dispersing the additives within the polymer, for melting the polymer and for solidifying the polymer, and therefore need not be discussed in further detail.

Shaped articles according to this invention may be manufactured from the mixtures according to this invention by casting, compression molding or injection molding; films may be obtained by blowing or by slit extrusion; filament, bars, tapes and the like, may be obtained by extrusion.

Various details of the invention will be more fully understood in the perspective of the specific illustrative embodiments described in the following examples.

EXAMPLE I

The propylene polymer used in the blends of this example was an undeashed propylene homopolymer having a melt flow rate of 1.9 g/10 min. It had been produced by polymerization of propylene in the presence of a high-efficiency catalyst composition containing a magnesium chloride-supported titanium chloride component and an organoaluminum catalyst component.

A control blend 1A was prepared from five pounds (2.270 gm) of polypropylene, 3.41 gm tetrakis(methylene(3,5-di-t-butyl-4-hydroxyhydrocinnamate)methane (Irganox 1010 antioxidant) and 2.27 gm aluminum magnesium hydroxycarbonate neutralizer (Kyowa DHT-4), by intensively mixing these components for about three minutes under nitrogen atmosphere. Similar blends containing the same stabilizer and neutralizer and also 5.68 gm of either benzoic acid or adipic acid (high purity grade, Aldrich Chemical), were prepared in an analogous manner.

These blends were then extruded at a nominal melt temperature of 450° F. and pelletized. From these pellets, 0.020 inch plaques were compression-molded and percent haze (per ASTM D1005) and DSC onset cyrstallization temperature (determined at 10° C./min cooling rate) were measured for each formulation. Significant reductions in haze indicating improved visual clarity, along with elevation in the onset crystallization temperatures, were realized for the blends containing benzoic and adipic acids, compared to the control formulation. These results, provided in Table I, illustrate the clarity improvements possible when benzoic and adipic acids are incorporated into an undeashed propylene polymer produced by polymerization in the presence of a high-efficiency magnesium halide-supported catalyst.

TABLE I

| CLARITY AND CRYSTALLIZATION TEMPERATURE MEASUREMENTS HOMOPOLYMER | | | |
|---|---|---|---|
| Blend: | 1A | 1B | 1C |
| Additives (wt %): | | | |
| Polypropylene | 99.75 | 99.50 | 99.50 |
| Adipic Acid | — | 0.25 | — |
| Benzoic Acid | — | — | 0.25 |
| Irganox 1010 | 0.15 | 0.15 | 0.15 |
| DHT-4A | 0.10 | 0.10 | 0.10 |
| Haze | 60 | 33 | 26 |
| DSC Crystallization Temperature (°C.) | 120 | 130 | 132 |

EXAMPLE II

Example I was repeated except that the polymer was an undeashed random copolymer produced with a high-efficiency catalyst similar to the one used to prepare the homopolymer of Example I. The random copolymer had a melt flow rate of 2.8 gm/10 min. and a polymerized ethylene content of 1.9 wt%.

These blends were extruded, pelletized and compression molded into 0.020 inch plaques following conditions set forth in Example I. Haze and DSC crystallization temperature measurements for these formulations indicated that an unexpected improvement in visual clarity and increase in freezing temperature are attainable by use of benzoic and adipic acids in random copolymer propylene. Results are provided in Table II.

TABLE II

| CLARITY AND CRYSTALLIZATION TEMPERATURE MEASUREMENTS | | | |
|---|---|---|---|
| Blend: | IIA | IIB | IIC |
| Additives (wt %): | | | |
| Propylene | 99.75 | 99.50 | 99.50 |
| Adipic Acid | — | 0.25 | — |
| Benzoic Acid | — | — | 0.25 |
| Irganox 1010 | 0.15 | 0.15 | 0.15 |
| DHT-4A | 0.10 | 0.10 | 0.10 |
| Haze | 58 | 26 | 37 |
| DSC Crystallization Temperature (°C.) | 110 | 122 | 123 |

EXAMPLE III

In order to determine if an aluminum benzoate clarifying agent was formed by in situ reaction of benzoic acid with the aluminum magnesium hydroxycarbonate neutralizer (Kyowa DHT-4A), five-pound blends were prepared using random copolymer propylene made via standard catalyst and deashed (1.1-MFR, 2.0% ethylene) along with similar copolymer but undeashed and made via high-efficiency, magnesium chloride supported catalyst (1.8 MFR; 1.9% ethylene). The standard catalyst polymer blends contained 5.68 gm benzoic acid with and without 2.27 gm DHT-4A and a control without either acid or neutralizer. The high-efficiency catalyst polymer formulation contained both benzoic acid (5.68 gm) and neutralizer (2.27 gm). All blends were stabilized with 2.27 gm 1,3,5-trimethyl-2,4,6-tris(3,5-tert-butyl-4-hydroxybenzyl)benzene (Ethyl 330) and 5.68 gm glycerol monostearate as processing aid. These blends were prepared by direct additive addition and intensive mixing for about 3 minutes under nitrogen.

All blends were extruded, pelletized and compression molded into 0.020 inch plaques using conditions described in Example I. Haze and DSC crystallization temperature measurements for these formulations showed that no clarity improvements or freezing point increases were realized when benzoic acid was incorporated into standard catalyst, low ash, random copolymer, regardless of the presence of neutralizer. However, when benzoic acid was blended into the undeashed random copolymer, marked improvement in clarity and increase in freezing point was observed.

TABLE III

| | Polypropylene Type: | | | |
| --- | --- | --- | --- | --- |
| | Standard Catalyst Type | | | High-Efficiency Type |
| Blend: | IIIA | IIIB | IIIC | IIID |
| Additives (wt %): | | | | |
| Polypropylene | 99.65 | 99.40 | 99.30 | 99.30 |
| Benzoic Acid | — | 0.25 | 0.25 | 0.25 |
| Ethyl 330 | 0.10 | 0.10 | 0.10 | 0.10 |
| GMS | 0.25 | 0.25 | 0.25 | 0.25 |
| DHT-4A | — | — | 0.10 | 0.10 |
| Haze | 48 | 46 | 73 | 37 |
| DSC Onset: Crystallization Temperature (°C.) | 108 | 107 | 112 | 124 |

It is to be understood that many modifications and alterations can be made to this invention without departing from its scope, which is defined by the specification and appended claims.

What is claimed is:

1. A process for the production of propylene polymer compositions of improved clarity as measured by haze which comprises:
   (a) mixing an undeashed propylene polymer with from about 0.01 to about 3 wt. % of a magnesium-aluminum hydroxycarbonate and from about 0.1 to about 0.3 wt. % of benzoic acid or adipic acid based on the weight of the polymer, in the absence of added free aluminum hydroxide or aluminum alkoxide, said polymer having been produced by polymerization in the presence of a high-activity catalyst composition containing a magnesium halide-supported titanium halide catalyst component and an organoaluminum co-catalyst component,
   (b) melting the resulting mixture and
   (c) cooling the melted mixture to recover a propylene polymer of improved haze properties.

2. The process of claim 1 wherein the propylene polymer contains at least about 75 wt% polymerized propylene constituents.

3. The process of claim 2 wherein at least a portion of the propylene polymer is a random copolymer of from about 1 to about 10 wt% of polymerized ethylene and from about 90 to about 99 wt% of polymerized propylene.

* * * * *

Notice of Adverse Decisions in Interference

In Interference No. 102,582, involving Patent No. 4,704,421, F. M. Teskin, NUCLEATION OF PROPYLENE POLYMERS, final judgment adverse to the patentees was rendered May 18, 1992, as to claims 1-3.

*(Official Gazette August 25, 1992.)*